(12) United States Patent
Rudin et al.

(10) Patent No.: US 7,169,372 B1
(45) Date of Patent: Jan. 30, 2007

(54) METHOD FOR PRODUCING NANO-SIZED CRYSTALLINE HYDROXYAPATITE

(75) Inventors: Vsevolod Nikolaevich Rudin, Moscow (RU); Vladimir Fedorovich Komarov, Moscow (RU); Igor Vitallevich Melikhov, Moscow (RU); Vladimir Vasillevich Minaev, Moscow (RU); Andrei Yurievich Orlov, Moscow (RU); Viktor Evgenievich Bozhevolnov, Moscow (RU)

(73) Assignee: Zakrytoe Aktsionernoe Obschestvo "Ostim", Moscow (RU)

( * ) Notice: Subject to any disclaimer, the term of this patent is extended or adjusted under 35 U.S.C. 154(b) by 326 days.

(21) Appl. No.: 10/332,088

(22) PCT Filed: Jul. 3, 2000

(86) PCT No.: PCT/IB00/01232

§ 371 (c)(1),
(2), (4) Date: Jun. 17, 2003

(87) PCT Pub. No.: WO02/02461

PCT Pub. Date: Jan. 10, 2002

(51) Int. Cl.
*C01B 25/32* (2006.01)
(52) U.S. Cl. ..................... 423/308; 423/309
(58) Field of Classification Search ............... 423/308, 423/309, 311
See application file for complete search history.

(56) References Cited

U.S. PATENT DOCUMENTS

| | | | | |
|---|---|---|---|---|
| 4,274,879 A | * | 6/1981 | Irvine | 501/142 |
| 4,324,772 A | * | 4/1982 | Conn et al. | 423/309 |
| 4,335,086 A | * | 6/1982 | Spencer | 423/308 |
| 4,349,518 A | * | 9/1982 | Long et al. | 423/308 |
| 4,448,758 A | * | 5/1984 | Nagai et al. | 423/308 |
| 4,481,175 A | * | 11/1984 | Iino et al. | 423/308 |
| 4,497,075 A | * | 2/1985 | Niwa et al. | 424/423 |
| 4,952,323 A | * | 8/1990 | Nakabayashi et al. | 210/691 |
| 5,158,756 A | * | 10/1992 | Ogawa et al. | 423/309 |
| 5,217,699 A | * | 6/1993 | Tagaya et al. | 423/308 |

(Continued)

FOREIGN PATENT DOCUMENTS

JP  62-132713  * 6/1987

(Continued)

OTHER PUBLICATIONS

PCT International Preliminary Examination Report dated Mar. 28, 2002, Form PCT/IPEA/409.
PCT nternational Search Report dated Feb. 26, 2001, Form PCT/ISA/210.

*Primary Examiner*—Wayne A. Langel (57) ABSTRACT

A mechanism and technological process for synthesizing nano-sized crystalline hydroxyapatite. In particular, for producing nano-sized crystalline hydroxyapatite whose particles have nano dimensions in length "l", width "d" and thickness "h", wherein "h" is practically corresponding to the size of one transmission of crystallographic cell a method is disclosed involving the steps of mixing and homogenizing a suspension comprising calcium hydroxide with an amount of phosphoric acid within a first reactor thereby adjusting a defined alkaline pH-value of the resulting mixture, feeding the mixture into a second reactor for causing phase transformations of the mixture and feeding the mixture into a third reactor for providing a suspension by adding a suspension of calcium hydroxide to the mixture to then feed the suspension into the first reactor, whereby each of these steps is cyclically carried out in continuous periodical conditions within at least three stages thereby producing nano-sized crystalline particles of pure hydroxyapatite as a solid phase.

20 Claims, 5 Drawing Sheets

U.S. PATENT DOCUMENTS

| | | | | |
|---|---|---|---|---|
| 5,405,436 | A | * | 4/1995 | Maurer et al. ................. 106/35 |
| 5,427,754 | A | * | 6/1995 | Nagata et al. ............... 423/308 |
| 5,651,884 | A | * | 7/1997 | Ichitsuka et al. ........ 210/198.2 |
| 5,833,959 | A | * | 11/1998 | Atsumi et al. ................ 424/57 |
| 5,858,318 | A | * | 1/1999 | Luo ........................... 423/308 |
| 6,159,437 | A | * | 12/2000 | Itoi et al. .................... 423/308 |
| 6,228,339 | B1 | * | 5/2001 | Ota et al. .................... 423/308 |
| 6,287,530 | B1 | * | 9/2001 | Aoyama et al. ............ 423/308 |
| 6,395,037 | B1 | * | 5/2002 | Akashi et al. ........... 623/23.56 |

FOREIGN PATENT DOCUMENTS

| | | | |
|---|---|---|---|
| JP | 63-159207 | * | 7/1988 |
| JP | 3-218911 | * | 9/1991 |
| WO | WO 94 02461 | | 9/1994 |
| WO | WO 98 18719 | | 7/1998 |

* cited by examiner

METHOD FOR PRODUCING NANO-SIZED CRYSTALLINE HYDROXYAPATITE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention refers to a technology for producing inorganic materials in general and, in particular, to a method for producing nano-sized crystalline hydroxyapatite as well as to nano-sized crystalline hydroxyapatite itself which is possible to be produced by that method.

TECHNICAL FIELD

Hydroxyapatite ($Ca_{10}(PO_4)_6(OH)_2$-"HAP") is one of few bio-compatible mineral substances attracting a constant interest to its synthesis and properties. There were developed different methods for synthesizing HAP with different shape and size of crystals. Produced crystals of HAP are to be used in medicine, especially as bone surgery, in the stomatology or as sorbent for medicinal preparation, and for example as sorbent in organic and inorganic chemistry and in gas-liquid chromatography.

However possibilities of the synthesis of new forms are proved to be not exhausted yet.

The aforementioned areas of application of produced HAP determine the principal requirements and properties that the produced HAP should possess. Those requirements and properties especially relate to its chemical and phase purity, i.e. the hydroxyapatite should lacks other calcium phosphates. Furthermore, HAP should be nano crystalline, since it should be of small size and have a high specific surface.

A known method of HAP production disclosed in the patent of Japan, No. 62-43524, 1987 involves the mixing of a suspension of calcium hydroxide with phosphoric acid during grinding either a reaction product or mixture obtained after mixing that ensures a mechanochemical activation of reagents. For this method mills and grinders of different types are used as grinding device and glass or aluminum balls as grinding medium.

However, one disadvantage of this method is that it produces large crystalline product. Moreover that given prior art method does not allow producing fairly pure HAP.

The most similar method to the proposed inventive method in view of the technical essence and the achieved results is an other known method for producing hydroxyapatite disclosed by PCT/IB97/01414 or by PCT/RU 93/00258 which is equal to the patent of the Russian Federation No.207745, 1997. The known method disclosed therein involves an interaction of calcium hydroxide suspension with phosphoric acid in a closed circuit with a consecutive passage of a calcium hydroxide suspension through two zones with the continuous supply of phosphoric acid into the first zone taken in quantity necessary to attain a pH-value in the range between 10 and 11, diluting the resulting mixture of calcium hydroxide suspension up to 400 to 500 times in the second zone and feeding the obtained mixture back into the first zone. Then the process is repeated ensuring a 4 to 5 fold circulation of the whole volume of mixture during 10 min to 15 min before the supply of phosphoric acid is terminated and the suspension of the obtained product is additionally stirred during 10 min to 12 min. As a result a suspension of 4.5% to 5.0% of HAP is produced. Further, the suspension is directed to a drying process to produce solid HAP or for dehydration by centrifugation to produce a suspension with a concentration of 18% to 33% of HAP.

This method ensures producing of the pure product of the predetermined composition with an increased yield up to 99.5% to 99.8% of the theoretical and improves its adaptability to manufacture.

However, one of the main disadvantages of this known method is a relative large thickness h of the obtained crystals something in the order of 0.05 µm to 0.1 µm and a relatively small specific surface of about 70 $m^2/g$ to 100 $m^2/g$. Therefore, the given particles are not nano crystalline and are capable to form aggregates up to 1 µm having reduced chemical and biological activity, and sorption capacity, as well.

SUMMARY OF THE INVENTION

An object of the present invention is to produce nano-sized crystalline hydroxyapatite whose particles have nano dimensions in length "l", width "d" and thickness "h", wherein "h" is practically corresponding to the size of one transmission of crystallographic cell.

According to the invention a method is disclosed, involving an interaction of a calcium hydroxide suspension with phosphoric acid in a stoichiometric ratio, comprising the steps of mixing and homogenizing a suspension comprising calcium hydroxide with an amount of phosphoric acid within a first reactor thereby adjusting a defined alkaline pH-value of the resulting mixture, feeding the mixture into a second reactor for causing phase transformations of the mixture and feeding the mixture into a third reactor for providing a suspension by adding a suspension of calcium hydroxide to the mixture to then feed the suspension into the first reactor, whereby each of these steps is cyclically carried out in continuous periodical conditions within at least three stages thereby producing nano-sized crystalline particles of pure hydroxyapatite as a solid phase.

As a result, by directing the crystallization reaction into the aforementioned predetermined crystallization route one obtains nano-sized crystalline hydroxyapatite with average dimensions of length "l" equal to 0.06 µm±50%, of width "d" equal to 0.015 µm+50% and of thickness "h" in the range between 0.000688 µm and 0.000814 µm depending on the direction of the symmetry axis (c) of a crystallographic unit cell.

Consequently, such nano-sized crystalline hydroxyapatite being a highly active flat crystal with a ratio l:d=1:4 and, from the physical point of view, with a minimal possible crystal thickness "h" predetermining the structure liability of the obtained crystals can be called as two dimensional crystalline hydroxyapatite (THAP).

In practice it turned out, that an optimal interaction of calcium hydroxide and phosphoric acid is at a ratio of Ca/P equal to about 1.67±0.03.

In a preferred embodiment during the first stage the first reactor, i.e. a first mixing reactor is filled with calcium hydroxide suspension and phosphoric acid in quantities necessary to attain a pH-value something in the order of 8 to 9 with a holding time of about 0.2 s to 0.8 s and with a flow velocity between 10 m/s and 20 m/s.

A holding time more than 0.8 s may result in a formation of additional intermediate phases, in increasing the thickness h of the final crystals in several times and in deterioration of the final product. A holding time less 0.2 s is not expedient because a homogeneity of the mixing flows is not achieved resulting in deteriorating the quality of the final HAP.

A flow velocity less then 10 m/s does not ensure complete homogenization resulting in deterioration of the final HAP, as well. A flow velocity of suspension larger than 20 m/s is not expedient because it results in increasing power consumption and in complicated technical construction of the first rector though increasing the flow rate during mixing does not affect the final product quality.

When the mixture is fed into the second stage carried out in a reactor of complete replacement where the suspension undergoes a series of consecutive phase transformations producing HAP with the aforementioned dimensions the mixture is advantageously kept therein during 10s to 20s at a pH-value in substantial of 8 to 9.

If the time of the flow in the reactor of replacement is less then 10 s a given series of consecutive transformations from DCP to OCP to TCP to HAP cannot be fulfilled and the process for producing HAP is terminated in the third stage. In this case HAP crystals are not two-dimensional and their thickness h increases in several times, i.e. the product quality degrades. If, however, the moving time of the flow the reactor of replacement is less more then 20 s an active aggregate growth of crystals begins due to their co-growth along the planes that also results in increasing h in several times, i.e. the quality degrades.

A pH-value in the range between 8 to 9 in the second stage is optimal for occurring the consecutive transformations from DCP to OCP to TCP to HAP. At pH values less than 8 the process of phase transformations has not time to be finished and in case of feeding a suspension flow with an incomplete phase transformation into the third stage the thickness of crystals h increases in several times, resulting in the degradation of the product quality. At pH values larger than 9 the process of phase transformations is completed prior to discharge of the suspension from the second reactor, inducing an active aggregate growth of HAP crystals with the co-growth along the planes, that also results in increasing the thickness h of crystals.

In a further preferred embodiment, the third reactor with a stirrer containing a suspension of calcium hydroxide with a solid/liquid phase ratio (S:L) depending on the final required concentration comprises a solid to liquid ratio of 1:40.

A mixture of the obtained HAP and calcium hydroxide is directed back into the first stage to where phosphoric acid is fed while the aforementioned conditions are kept. Then the mixture again is directed into the second and third stages, whereby the realization of circulation of the whole reaction volume through three reactors or stages is repeated cyclically until calcium hydroxide disappears completely and HAP is formed, i.e. until a mixture of solid phase, containing hydroxide and HAP, and of liquid phase with a gradual disappearance of calcium hydroxide during its introduction into reaction with phosphoric acid is obtained.

It turned out, that if the circulation ratio is less then 10 the mentioned series of consecutive transformations of DCP to OCP to TCP to HAP does not fulfilled and the process of HAP production is finished in the third stage. In this case the HAP crystals are not two-dimensional and nano-sized crystalline and their thickness h increases in several times, i.e. a degradation of the product quality is occurring. If the circulation ratio is larger than 20 an active aggregate growth of crystals begins in the reactor of replacement due to their co-growth along the planes, that also results in increasing h in several times, i.e. in decreasing the product quality.

BRIEF DESCRIPTION OF THE DRAWINGS

The invention is described in more detail in view of experimental studies in connection with the appended drawings and in view of a preferred embodiment for the technology of producing nano-sized HAP.

In the drawings:

FIG. 1B shows two-dimensional-hydroxyapatite-nanoplates in a high resolution electron microscopy at a time t=40 s, wherein in the electron micrographs:

S1 is for axis of zone [$\overline{1}$ 100] with supposed thickness of 3.3 nm and 30 nm of defocusing and S2 is for axis of zone [$\overline{4223}$] with supposed thickness 2.0 nm and 33 nm of defocusing;

DETAILED DESCRIPTION OF THE INVENTION

Using experimental arrangements performing the synthesizing of hydroxyapatite (HAP) by an instant mixing method of the reagent solutions in specific temperature and hydrodynamic conditions we have prepared HAP in two-dimensional crystalline form.

Figure 1A:
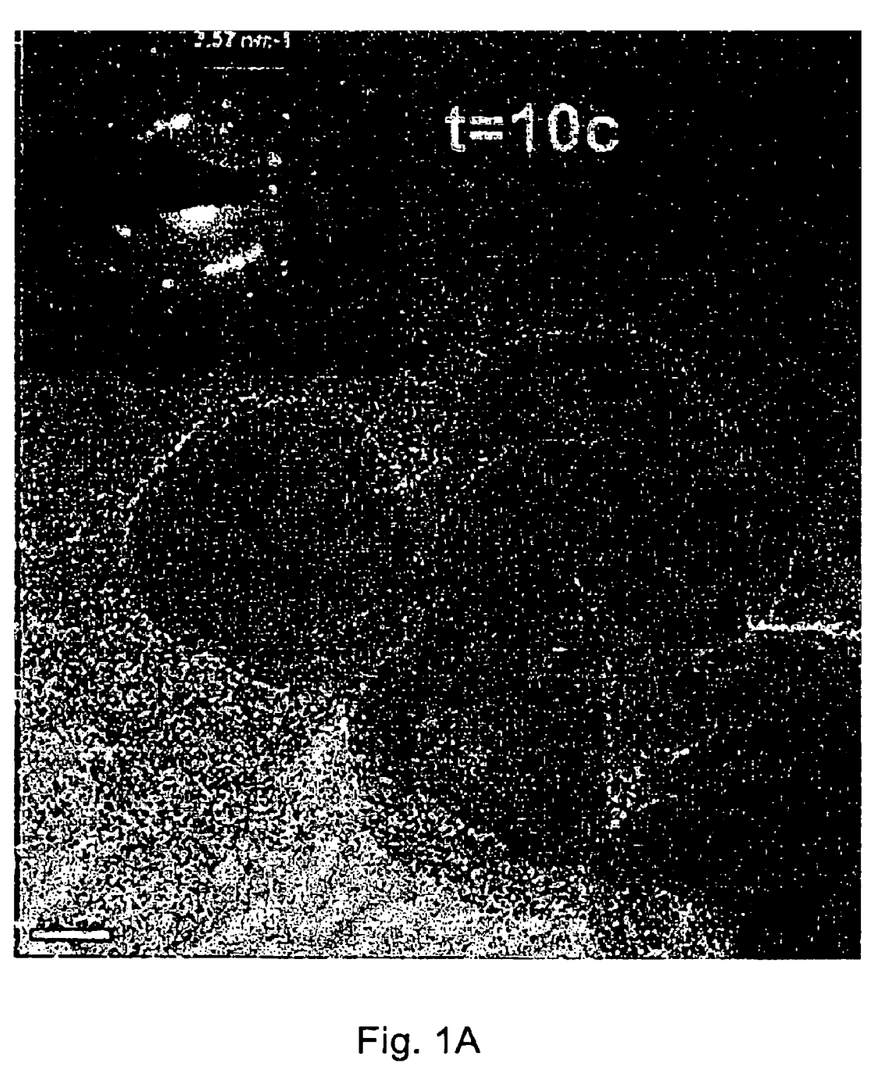
FIG. 1A shows two-dimensional-hydroxyapatite-nanoplates in a high resolution electron microscopy at a time t=10 s.
Figure 1B:
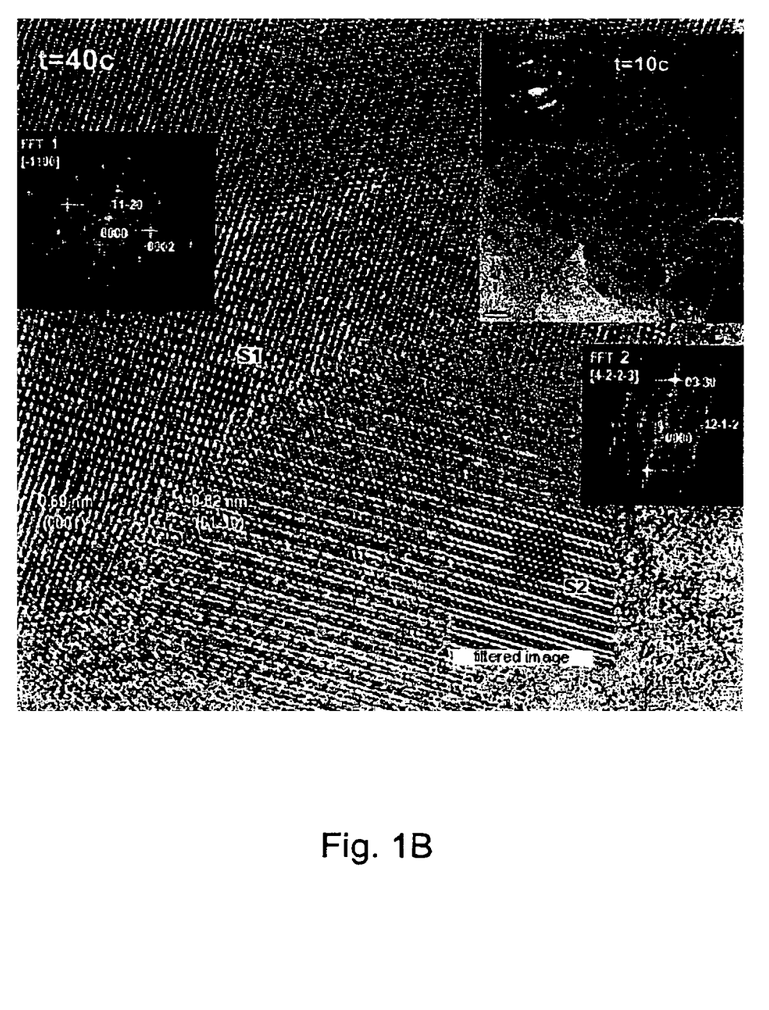

FIG. 1 presents electron micrographs of the solid phase particles, produced by short injection of a jet of a H$_3$PO$_4$ solution into a thermostatic rector filled with a stirred 0.02 mole/l solution of Ca(OH)$_2$ at 298 K and with an atomic ratio of calcium and phosphorous (Ca/P) equal to 1.67±0.01 with further stirring of the mixture at 298 K.

The particles were selected from the reactor during different times t after the acid injection and subjected to sublimation drying. It turned out that for a X-ray phase analysis (Cu$_{k\alpha}$) the produced phase is amorphous so the particles are investigated by a transmission electron microscopy (TEM). TEM images of the particle have been obtained using a SM-300 microscope with an auto-ionic electron source in a high resolution mode described by Suvorova E. I. et al, Kristallografia (RUS), 2000, n.4, v.45, p. 40. Experimental electron micrographs have been analyzed with a program called "Digital Micrograph" and compared with theoretical micrographs computed with the help of EMS program, according to Stadelmann P. A., Ultramiroscopy 1987, v.21, n.1, p. 131.

It was found that at $t=10^4$ s all particles are nanoplates and possess the crystalline lattice of HAP. A TEM micrograph of any separate nanoparticle is dotted and aggregates of such particles produce diffuse pattern of electron diffraction with two wide rings. The distribution of the width (d) of the nanoplates particles is given in FIG. 2.

Figure 3:
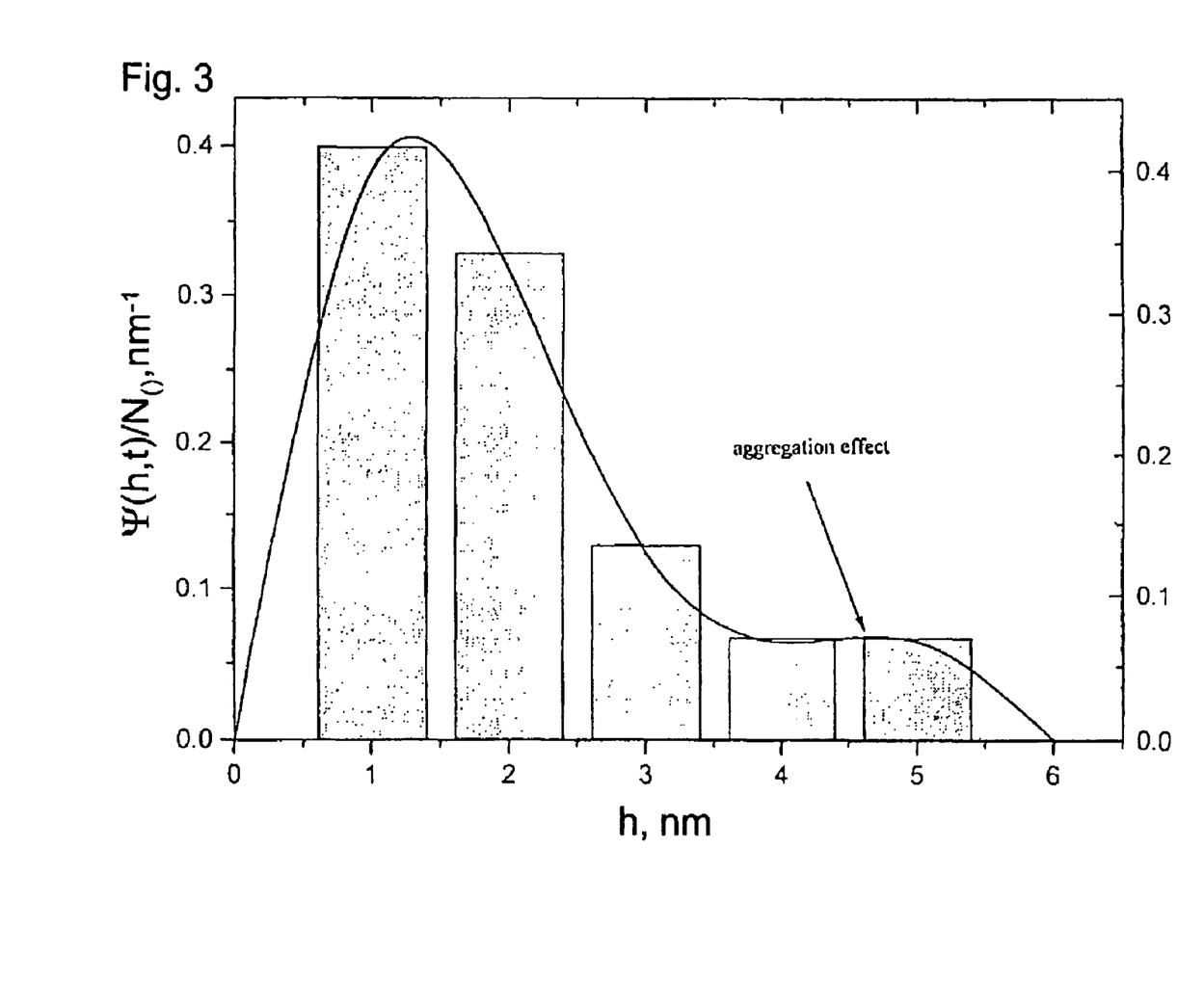
FIG. 3 shows a distribution function of the thickness of the nanoplates after sublimation drying at t=10 s.

The thickness "h" of the plates has been determined in a tunnel microscope "STM NS 100-1v" (Moscow, Institute of Nanotechnology) with a determination precision being proved enough to estimate their distribution function $\Psi(h,t)$ over h at $t=10$ s as presented in FIG. 3 showing the presence of mono cell thickness crystals and also aggregates consisting of 2, 3, 4 or more crystals.

According to a chemical analysis a phase after drying in air at 293K up to a constant mass has a composition of $$Ca_{10}(PO_4)_6(OH)_2 \cdot 3H_2O \quad (1).$$

A reversible dehydration of this phase takes place at 400K. The phase analysis carried out with an electron diffraction and electron micrographs including computed images has definitely pointed out the structure of hydroxyapatite.

Thus the water molecules in formula (1) are not crystal hydrate ones and does not enter the structure of hydroxyapatite. The water is chemically adsorbed by nanoplates, whose surface is rather large.

Due to the thickness of the nanoparticles equal to the 1 to 3 unit cell parameters the synthesized substance may be called as two dimensional crystalline pseudo crystal hydrate with the HAP structure or two dimensional crystalline hydroxyapatite (THAP).

As investigations have shown during a synthesis of THAP substantially the following reaction takes place. As soon as acid is injected nanoplates appear having the composition $Ca_8H_2(PO_4)_6$ with the structure of octacalcium-phosphate (OCP) and sizes as presented in FIGS. 2 and 3. Such composition of nanoplates is demonstrated by a change in the calcium and phosphorus quantities and the pH-value of the solution at $t=10$ s–$10^2$ s. It was not possible to establish whether the given nanoplates contain chemically sorbed water because their composition is changed upon withdrawal from the reactor.

In the studies described upon withdrawal of the nanoplates the test sample of suspension taken from the reactor was slowly dried or it was immediately frozen with subsequent sublimation of the formed ice. Upon evaporation of water or formation of ice a part of nanoplates have transformed into THAP. Those conserving the composition of OCP were decomposed in the beam of the microscope. However, before decomposition some of them may be identified by electron micrographs and it was possible to show that they have the structure of OCP. Taking into account that the nanoplates transform into THAP it may be supposed that they contain large amount of chemically sorbed water i.e., a first product of the synthesis is two dimensional octacalcium phosphate.

The nanoplates of OCP adsorb $Ca(OH)_2$ from the solution resulting in reaction:

$$Ca_8H_2(PO_4)_6 + 2Ca(OH)_2 \rightarrow Ca_{10}(PO_4)_6(OH)_2 + 2(H_2O) \quad (2)$$

Figure 4:
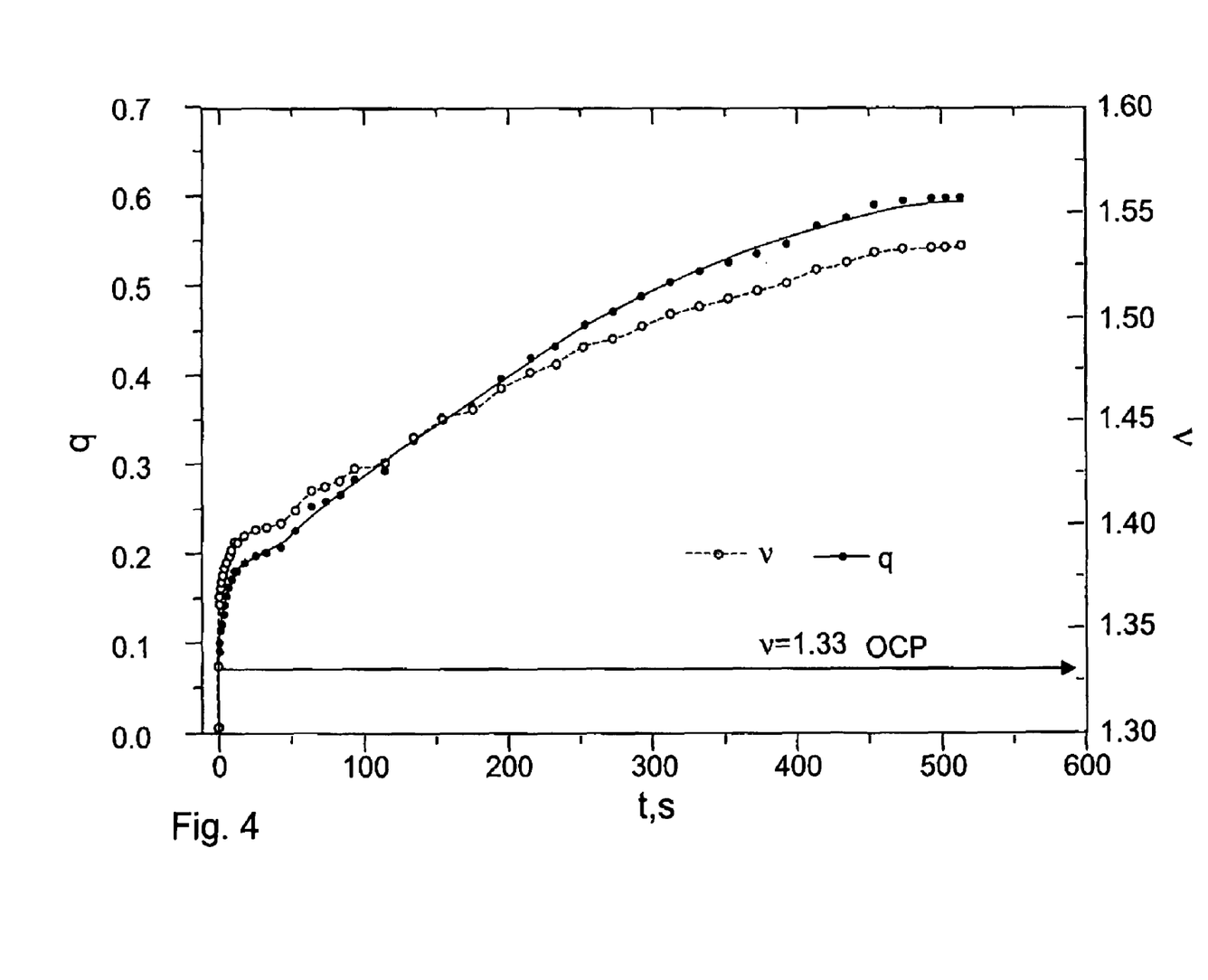
FIG. 4 shows the changing of the properties of the solid phase in time, with v being the molar ratio Ca/P in the solid phase q being the fraction of nanoplates of octacalcium phosphate (OCP) transformed into THAP.

The reaction (2) proceeds without destroying the integrity of the nanoplates and almost without changing their size: in each nanoplate the nuclei of HAP appear which relatively quickly grows into its bulk and may pass also onto the neighboring nanoplates. The HAP nuclei are not formed at the same instant so the quantity of the nanoplates transformed into THAP increases in time as shown in FIG. 4. At $t=10^4$ s practically all nanoplates have transformed into THAP and the process (2) terminates.

Further the plates perfect their cut and become thicker and together with thickening a diffraction pattern of the solid phase extracted from the reactor changes from a typical one for X-ray amorphous substances to a typical one for 3-dimensional crystalline HAP. The thickening of the plates becomes rather marked at $t>10^5$ s. In a range of $t=20$ s to $t=10^5$ s the size and shape of the nanoplates do not practically change. Thus THAP is formed substantially by means of the precursor OCP from where the two dimensional state is inherited that proved to be rather stable in the aqueous solution.

Reasons of the relative stability of OCP and THAP may be disclosed by means of the following model. At $t=0$ s to $t=10^2$ s the distribution function of the OCP crystals for dimension $\{x_i\}$ changes according to the Fokker-Plank equation in the form $$\frac{\partial \varphi}{\partial t} = \sum_{i=1}^{3} \frac{\partial}{\partial x_i}\left[\frac{\partial}{\partial x_i}(D_i \varphi) - G_i \varphi\right] - W\varphi \quad (3)$$

$$\int_0^\infty \int_0^\infty \left\{G_1\varphi - \frac{\partial}{\partial x_1}(D_1\varphi)\right\}_{x_1 \rightarrow 0} dx_2 dx_3 = J(\xi^{m_0} - 1). \quad (4)$$

Herein the term N is the concentration of the crystals whose dimensions are less than $\{x_i\}$, $G_i$ and $D_i$ are the velocity of the direction change of $\{x_i\}$ and a coefficient of its fluctuation, W is the transformation frequency of the crystals into aggregates, J is the characteristic velocity of nucleation, $\xi=C/C_\infty$, C and $C_\infty$ are total concentrations of all forms of phosphorous being in saturated and over-saturated solutions and $m_0$ is the kinetic order of nucleation.

During crystal growth the surface ionic clusters are formed on each face with a frequency $\Omega_i$ containing one or several $PO_4$ groups. These clusters grow along the face with the velocity $f_i$ forming new layers of the solid. Upon the definition according to Melikhov I. V., Zh.fiz.khimii (in Russian), 1987, v.63, n.2, p. 476:

$$G_i = h_0 \Omega S_i/P, \text{ and } D_i = (\tfrac{1}{2})\Omega_i S_i (h_0/P)^2 \quad (5),$$

with $S_i$ being the surface of the face, $h_0$ being the layer thickness, $h_0/P$ being a mean increment $x_i$ resulted from the formation and growth of a single cluster, $P=4+S^i (\Omega_i/f_i)^{2/3}$ (according to Obretenev W. et al, Crystal Growth, 1992, v.121, p. 495) and $$\Omega_i = \Omega_{i0}[\xi^{m_1} - \xi_n^{m_1}], f_i = f_{i0}[\xi^{m_2} - \xi_n^{m_2}] \quad (6).$$

Herein $\Omega_{i0}$ and $f_{i0}$ are specific values of $\Omega_i$; and $f_i$, $m_1$ and $m_2$ are kinetic orders of the formation and growth of the cluster, $\xi_n = C_n/C_\infty$, $C_n$ the solubility of crystal determined by the formula Gibbs-Thompson (with Tolman correction).

Suppose that some faces have as a high frequency $\Omega_i$ that $P=S_i(\Omega_i/f_i)^{2/3}$, and other ones have so small frequency $\Omega_i$ that $P=1$. In this case $$\Omega_{10}^{1/3} f_{10}^{2/3} \xi_0^{(2/3)(m_2-m_1)}/(\Omega_{20} b^2) \geq 10^6 \qquad (7),$$

wherein b is the size of a unit cell along perpendicular to the face with small frequency $\Omega_i$ and $\xi_0 = C_0/C_\infty$, $C_0$ are initial concentration of the solution.

Then, as the calculation is showing, immediately after nucleation each crystal transforms into plates whose bases are composed by molecularly smooth faces and side surfaces are formed by molecularly rough faces, as shown in FIG. 1. The bases of the plates grow so slowly and the side surfaces so quickly that the plates enlarge almost without thickening. Their growth results in decreasing C to $C_n$ for a period of the order $$\tau = 10^2 b / [h_0 \Omega_{10}^{1/3} f_{10}^{2/3} \xi_0^{(m_1+2m_2)/3}] \qquad (8).$$

During this time each plate has time to grow up to $x_i = d > 10^2 b$ and becomes thick only up to $x_2 = h \sim b$. Further the plate size changes relatively slowly due to recrystallization during which the concentration C decreases from $C_n$ to $C_\infty$ and due to the effect of aggregation occurring with low intensity W.

As a result of the moment $t \to \tau$ of distributions $$\Theta = (1/N_0) \int_0^{x_1} dx_1 \int_0^\infty dx_2 \int_0^\infty \varphi(x_i, t) dx_3,$$

where $N_0$ is the concentration of the nanoplates and $$\Psi(h, t) = \int_0^\infty \int_0^\infty \varphi(x_i, t) dx_1 \ldots dx_3 \qquad (9)$$

take an air which is observed in the experiments.

Figure 2:
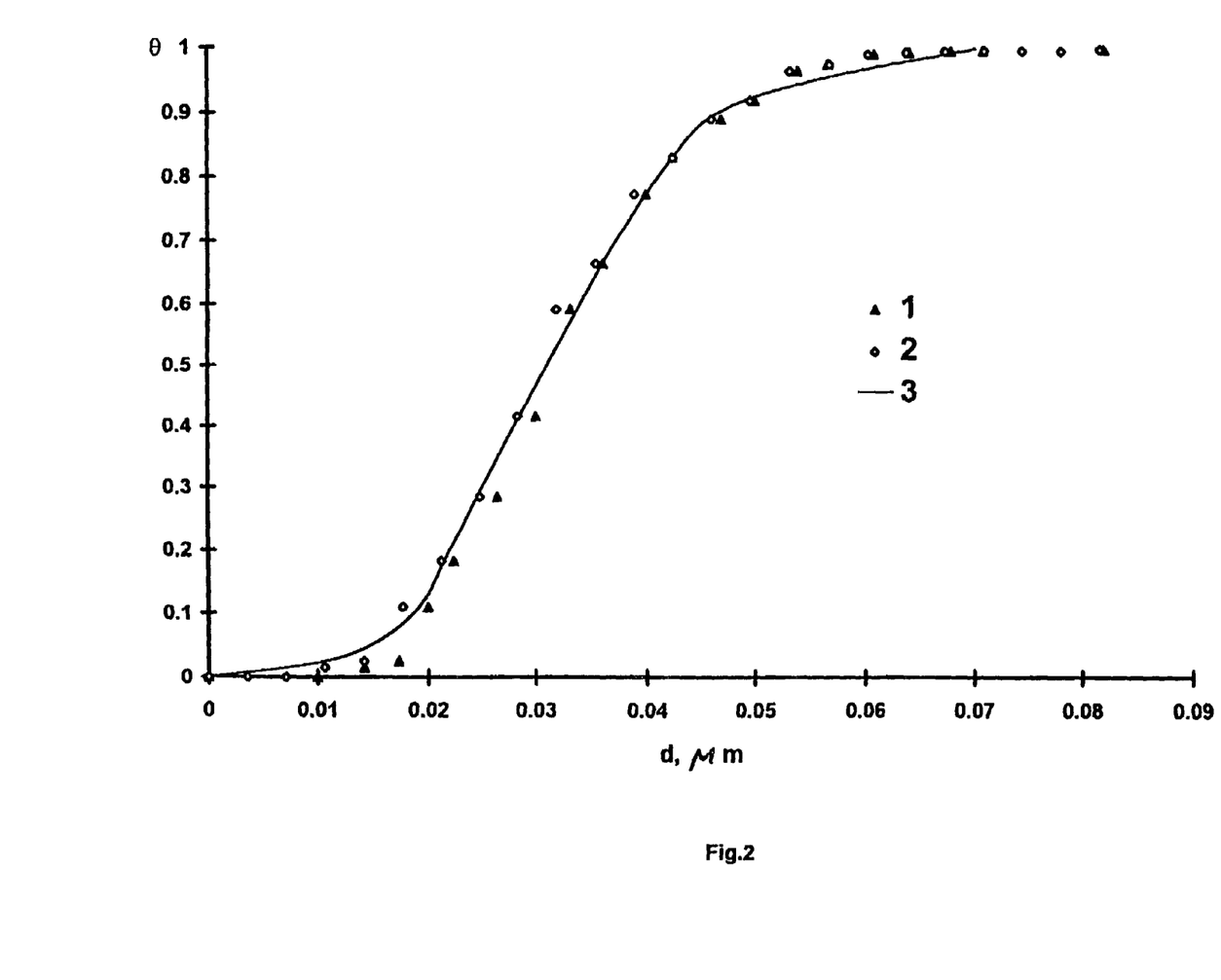
FIG. 2 shows three integral distribution functions 1, 2 and 3 of the nanoplates of the width (d). Θ—fraction of nanoplates whose width is less than 1 and with function 1 being sampled at the moment t=$10^2$ s, using sublimation drying, function 2 being sampled at the moment t=$10^4$ s, using filtration through track filter and air drying, and function 3 is a computation according to a model given in the subsequent formulas (3) to (6) at $x_1=x_2=1$, $m_0=m_1=m_2$, $\xi_0>10^3$, $h_0\Omega_{10}C_0/(J\rho)=38.98$ nm$^2$ (with $\rho$ being the crystal density) and $f_{10}/\Omega_{10}=5,3\cdot10^3$ nm$^3$.

We have shown that by means of digital solving the equation (3) to (7) (according to methods as disclosed by Berliner L. B. et al, Teor.osnovy khim.tekhol. (in Russian), 1985, v.19, n.1, p. 24 and by Samarskii A. A. et al, Computational Heat Transfer, v.1,2, Chichester, Wiley, 1995) at W=0 and adjusting the parameters J, $\Omega_{i0}$, $h_0$, $f_{i0}$ it is possible to obtain a detailed correspondence of the calculation and experiments, as shown in FIG. 2.

Coincidence of the computation and experiment points out that the cause of origin of the nanoplates in substantial is a sharp anisotropy of growth for different faces of the OCP crystals. On the faces of the bases blocked by chemically sorbed water, the formation of the surface clusters takes place for five orders rarely than on the side surfaces. Therefore, the crystals grow almost without thickening decreasing C up to level $C_n$, at which the faces of bases lack possibility to grow due to an increased solubility of the crystals. In consequence of condition $C \to C_n$ the nanoplates become metastable because at $t > 10^2$ s they may thicken only as a result of maturing or aggregation which proceed slowly.

The data obtained have permitted to admit that the calcium phosphates may present in the utmost two dimensional crystalline state at which all crystals have a thickness h=b at d>>b.

THAP (b=0.82 nm) prepared in our experiments was not in the utmost state due to adherence of the nanoplates by faces of the bases. The role of adherence is discovered in the special studies of the dependence of the OCP and THAP properties on the presence of collagen in the reactor. It was established that if tropocollagen ($M=5.10^3$) is introduced into reactor together with a $Ca(OH)_2$ solution, it is possible to determine the specific surface of the nanoplates in situ by measuring a quantity of collagen, which is gone together with the solid phase upon its withdrawal from the reactor. In the experimental conditions at t=40 s the specific surface is found to be equal 900±50 $m^2/g$ and close to the surface 920±20 $m^2/g$ calculated from the assumption that all nanoplates distributed according to the size, as shown in FIG. 2, have the same thickness h=b. This fact points out that OCP immediately after its formation was in the utmost two dimensional state which is stabilized by collagen.

Consequently, nano-sized crystalline hydroxyapatite with mean particle size of 50 nm and thickness something in the order of the cell parameters have been synthesized. Morphology and structure of nano-sized crystals have been studied with methods of high resolution electron microscopy and scanning tunnel microscopy. It was established that calcium phosphates are capable of for the phase transformations without loosing two dimensional crystalline state so that a mechanism of the formation of two dimensional phosphate phases could be disclosed.

Subsequently, the invention is described further in view of a preferred embodiment of the developed inventive technology for synthesis THAP basing on the results of the above studies.

The inventive technological process for synthesizing nano-sized crystalline HAP or even called THAP is carried out in particular by creation of special chemical technological conditions and with continuous-periodic conditions within three stages using three interconnected reactors producing TRAP by interaction of aqueous suspension of calcium hydroxide with phosphoric acid taken in the ratio Ca/P=1.67±0.03.

During the first stage the first reactor, i.e. a first mixing reactor, is filled with calcium hydroxide suspension and phosphoric acid in quantities necessary to attain a pH-value of 8 to 9. This first mixing reactor is for completely mixing and homogenization the mixture comprising calcium hydroxide and phosphoric acid.

The holding time in the first reactor is about 0.2 s to 0.8 s and a stirring is carried out with a velocity of suspension flow something in the order of to 10 m/s to 20 m/s. With the chosen velocities of the suspension flow this holding time is enough both for complete homogenization of the mixture and for preventing to form any other solid phase, such as dicalcium-phosphate (DCP), octacalcium-phosphate (OCP) or tricalcium-phosphate (TCP) during this stage.

Then the suspension is fed into the second stage carried out in a reactor of complete replacement where the mixture formed during the first stage undergoes a series of consecutive phase transformations producing HAP with the aforementioned dimensions. Since during this stage particular conditions of crystallization occur permitting to direct a crystallization of HAP in a predetermined crystallization route, this stage of synthesis is the most crucial for the production of two dimensional nano crystalline HAP with average dimensions of the crystals with length "l"≈0.06 μm, width "d"≈0.015 μm and thickness "h" something in the order of an unit cell parameter, i.e. h=0.000688 μm or 0.000814 μm.

It was found that under the preferred conditions that the suspension is kept within the second reactor during 10 s to 20 s at the pH value of 8 to 9, at first DCP is forming which transforms into OCP with its further transformation into amorphous TCP and then TCP transforms into crystalline HAP with the aforementioned mean parameters "l", "d" and "h".

When the first and second stages are carried out in the right way, the reaction mixture comprising the particles of two-dimensional crystalline HAP with the aforementioned necessary mean parameters "l", "d" and "h" is injected into the third stage, i.e. into a second mixing reactor. The second mixing reactor comprises a stirrer that contains a suspension of calcium hydroxide with a solid/liquid phase ratio (S:L) something in the order of 1:15 up to 1:1000. With other words the suspension flow after the second stage is going into the third stage where a suspension of calcium hydroxide with an approximate solid/liquid phase ratio S:L=1:15 to 1:1000 is placed depending on the required final concentration of HAP.

Subsequently, a diluted mixture of the obtained HAP and calcium hydroxide is directed back into the first stage, i.e. into the first mixing reactor to where phosphoric acid is fed while the aforementioned conditions are kept. Then the mixture is directed again into the second and third stages.

This Process is repeated cyclically until calcium hydroxide disappears completely and HAP is formed.

The aforementioned conditions of the process are preserved for each stage, thus ensuring a 10 to 20 fold circulation of the whole volume of the mixture during the synthesis. The whole process is carried out at a temperature of 40° C. to 60° C. However, the temperature seems not to practically affect the processes of the phase transformations and the final result.

The supply of the acid is interrupted when a complete equimolarity is achieved keeping the pH value at a level of 8 to 9 during the whole technological process. The obtained suspension with a concentration up to 10% of HAP is used as a finished product which is subjected to separation, concentration and drying to produce a final product in the form of suspension, paste or dry powder with the concentration being in a range from 0.1% to 100% of HAP.

As a result, the realization of circulation of the whole reaction volume through three reactors or stages causes (a) the formation of a mixture of solid phase, containing hydroxide and HAP, and of liquid phase with a gradual disappearance of calcium hydroxide during its introduction into reaction with phosphoric acid and (b) the producing a HAP suspension with a concentration equal to or less then 10% of HAP, which, as said above, is subjected to the corresponding treatment.

However, it appears to be noteworthy that if a suspension with a concentration above 10% of HAP is produced a violation of the crystallization route, especially in the second stage takes place resulting in an aggregate formation of HAP that in turn degrades the product quality.

For setting an example in carrying out the process of synthesizing according to the aforementioned conditions, into the second mixing reactor with an operating stirrer containing distilled water 624g of calcium oxide are introduced until a suspension with a solid/liquid ratio S:L of 1:40 is obtained.

Then the circulation of suspension flow is initiated with a circulation ratio of 16. Afterwards phosphoric acid is supplied into the first stage where the value of pH-value is kept equal to 8,5. The holding time in the first stage, i.e. the first mixing reactor is 0.6 s with a flow rate of suspension during stirring of 17 m/s. Then the mixture is fed into the second stage of the process, i.e. into the reactor of complete replacement, where the holding time for a mixture is 16 sec at pH-value of 8,5. Thereafter, the mixture due to the circulation (the circulation ratio was 16) is supplied into the third stage.

The process was recycled until a pure phase of hydroxyapatite was produced, wherein the pH-value was kept in the whole technological circuit at a level of 8,5. The produced suspension of hydroxyapatite was concentrated and dried to obtain aqueous paste with hydroxyapatite content of 30%.

As a result pure stoichiometric nano-sized crystalline HAP with a ratio Ca/P=1.66 was produced. The specific surface was 900 m$^2$/g and the average dimensions of the nano-sized crystals were l=0.062 μm, d=0.017 μm and h=0.0075 μm.

The invention claimed is:

1. A method for producing hydroxyapatite particles, involving an interaction of a calcium hydroxide suspension with phosphoric acid in a stoichiometric ratio, comprising the steps of
    a) mixing and homogenizing a suspension comprising calcium hydroxide with an amount of phosphoric acid within a first reactor thereby adjusting a defined alkaline pH-value of the resulting mixture
    b) feeding the mixture into a second reactor for causing phase transformations of the mixture,
    c) feeding the mixture into a third reactor for providing a suspension by adding a suspension of calcium hydroxide to the mixture to then feed the suspension into the first reactor,
        wherein the holding time in the first stage is 0.2 s to 0.8 s and wherein each of the steps a), b), c) is cyclically carried out in continuous periodical conditions within at least three stages thereby producing nano-sized crystalline particles of pure hydroxyapatite as a solid phase.

2. The method of claim 1, involving an interaction of calcium hydroxide and phosphoric acid in a ratio Ca/P=1.67±0.03.

3. The method of claim 1, wherein the pH-value is adjusted to 8 to 9, and the mixture is stirred with a velocity of the flow equal to 10 m/s–20 m/s.

4. The method of claim 1, wherein the mixture is kept in the second stage during 10 s–20 s at a pH of 8 to 9 for transforming to nano crystalline hydroxyapatite.

5. The method of claim 1, wherein a 10 to 20 fold circulation of the whole volume of the mixture is ensured by cyclically repeating the steps a), b) and c).

6. The method of claim 1, wherein the method is carried out by a temperature between 20° C. and 60° C.

7. The method of claim 1, wherein the suspension of calcium hydroxide is prepared during mixing of calcium oxide in water with a solid: liquid ratio of 1:15 to 1:1000 depending on the required final concentration of nano crystals of hydroxyapatite.

8. The method of claim 1, wherein the circulation between the first, second and third stages is stopped when the concentration of the hydroxyapatite within the suspension is less or equal to 10%.

9. The method of claim 8, wherein the prepared suspension is used as suspension, paste or after drying as dry powder of a concentration something in the order of 0.1%–100% of hydroxyapatite.

10. The method of claim 7, wherein the solid: liquid ratio is of 1:40.

11. A method for producing hydroxyapatite particles, involving an interaction of a calcium hydroxide suspension with phosphoric acid in a stoichimetric ratio, comprising the steps of a) mixing and homogenizing a suspension comprising calcium hxydroxide with an amount of phosphoric acid within a first reactor thereby adjusting a defined alkaline pH-value of the resulting mixture,
b) feeding the mixture into a second reactor, in which the mixture is kept during 10 s–20 s at pH of 8 to 9 for causing phase transformations of the mixture,
c) feeding the mixture into a third reactor for providing a suspension by adding a suspension of calcium hydroxide to the mixture to then feed the suspension into the first reactor,
wherein each of the steps a), b), c) is cyclically carried out in continuous periodical conditions within at least three stages thereby producing nano-sized crystalline particles of pure hydroxyapatite as a solid phase.

12. The method of claim 11, involving an interaction of calcium hydroxide and phosphoric acid in a ratio Ca/P=1.67±0.03.

13. The method of claim 11, wherein a 10 to 20 fold circulation of the whole volume of the mixture is ensured by cyclically repeating the steps a), b) and c).

14. The method of claim 11, wherein the method is carried out by a temperature between 20° C. and 60° C.

15. The method of claim 11, wherein the suspension of calcium hydroxide is prepared during mixing of calcium oxide in water with a solid:liquid ratio of 1:15 to 1:1000 depending on the required final concentration of nano crystals of hydroxyapatite.

16. The method of claim 15, wherein the solid: liquid ratio is of 1:40.

17. The method of claim 11, wherein the circulation between the first, second and third stages is stopped when the concentration of the hydroxyapatite within the suspension is less or equal to 10%.

18. The method of claim 17, wherein the prepared suspension is used as suspension, paste or after drying as dry powder of a concentration something in the order of 0.1%–100% of hydroxyapatite.

19. A hydroxyapatite composition comprising nano-sized crystalline hydroxyapatite having average dimensions with a length equal to 0.06 μm±50% and a width equal to 0.015 μm±50% and a thickness equal to one transmission of crystalline lattice of hydroxyapatite, wherein the hydroxyapatite crystals each having a specific surface of 800 $m^2/g$ to 950 $m^2/g$.

20. The hydroxyapatite composition of claim 19, wherein the thickness ranges between 0.000688 μm and 0.000814 μm depending on direction of symmetry axis of crystal cell.

* * * * *